(12) United States Patent
Kumar et al.

(10) Patent No.: US 9,958,526 B2
(45) Date of Patent: May 1, 2018

(54) LOCALIZATION WITH NON-SYNCHRONOUS EMISSION AND MULTIPATH TRANSMISSION

(71) Applicant: Massachusetts Institute of Technology, Cambridge, MA (US)

(72) Inventors: Swarun Suresh Kumar, Cambridge, MA (US); Dina Katabi, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 680 days.

(21) Appl. No.: 14/579,232

(22) Filed: Dec. 22, 2014

(65) Prior Publication Data
US 2015/0301152 A1    Oct. 22, 2015

Related U.S. Application Data

(60) Provisional application No. 61/921,127, filed on Dec. 27, 2013, provisional application No. 61/921,190, filed on Dec. 27, 2013.

(51) Int. Cl.
*G01S 5/04* (2006.01)
*G01S 3/14* (2006.01)
(Continued)

(52) U.S. Cl.
CPC ......... *G01S 3/14* (2013.01); *G01S 3/46* (2013.01); *G01S 3/48* (2013.01); *G01S 3/52* (2013.01);
(Continued)

(58) Field of Classification Search
CPC ...... G01S 3/14; G01S 3/46; G01S 3/48; G01S 3/52; G01S 3/72; G01S 5/0273;
(Continued)

(56) References Cited

U.S. PATENT DOCUMENTS 3,691,560 A * 9/1972 Hammack ............... G01S 1/302
342/387
5,589,838 A 12/1996 McEwan
(Continued)

FOREIGN PATENT DOCUMENTS

FR    2280088    2/1976
WO    2013/071302    5/2013
(Continued)

OTHER PUBLICATIONS

Amendolare et al., "Transactional Array Reconciliation Tomography for Precision Indoor Location." IEEE Transactions on Aerospace and Electronic Systems vol. 50, No. 1, Jan. 2014.
(Continued)

*Primary Examiner* — Chuong P Nguyen
(74) *Attorney, Agent, or Firm* — Occhiuti & Rohlicek LLP

(57) ABSTRACT

Directional characterization of a location of a target device makes use of multiple radio transmissions that are received from the target device. In some examples, each radio transmission is received at a first antenna at a fixed location, and is also received at a second moving antenna. The received transmissions are combined to determine the directional characterization, for example, as a distribution of power as a function of direction. In some examples, the received radio transmissions are processed to determine, for each of a plurality of directions of arrival of the radio transmissions, a most direct direction of arrival, for example, to distinguish a direct path from a reflected path from the target.

20 Claims, 5 Drawing Sheets

(51) Int. Cl.
*G01S 3/46* (2006.01)
*G01S 3/48* (2006.01)
*G01S 3/52* (2006.01)
*G01S 13/48* (2006.01)
*G01S 5/02* (2010.01)
G01S 19/24 (2010.01)
G01S 19/14 (2010.01)
G01S 13/90 (2006.01)
G01S 3/72 (2006.01)
H04L 27/26 (2006.01)
G01S 3/04 (2006.01)
H04W 64/00 (2009.01)

(52) U.S. Cl.
CPC ............ *G01S 5/0273* (2013.01); *G01S 13/48* (2013.01); *G01S 3/04* (2013.01); *G01S 3/72* (2013.01); *G01S 13/9023* (2013.01); *G01S 19/14* (2013.01); *G01S 19/24* (2013.01); *H04L 27/2601* (2013.01); *H04W 64/00* (2013.01)

(58) Field of Classification Search
CPC ...... G01S 5/0263; G01S 5/04; G01S 13/9023; G01S 13/9029; G01S 19/14; G01S 19/24; G01S 19/31
USPC ... 342/449, 25, 465, 357.52, 357.63, 357.71
See application file for complete search history.

(56) References Cited

U.S. PATENT DOCUMENTS

| | | | |
|---|---|---|---|
| 5,608,411 A * | 3/1997 | Rose | G01S 3/48 342/362 |
| 5,724,047 A * | 3/1998 | Lioio | G01S 3/48 342/417 |
| 6,148,195 A | 11/2000 | Schuchman et al. | |
| 6,421,007 B1 * | 7/2002 | Owen | G01S 3/023 342/417 |
| 6,540,607 B2 | 4/2003 | Mokris et al. | |
| 6,784,827 B2 | 8/2004 | Hirt | |
| 7,009,561 B2 | 3/2006 | Menache et al. | |
| 7,292,189 B2 | 11/2007 | Orr et al. | |
| 7,409,226 B1 * | 8/2008 | Stevenson | H04B 7/0802 342/417 |
| 7,417,586 B2 * | 8/2008 | Thomas | G01S 7/4021 342/118 |
| 7,515,916 B1 | 4/2009 | Alexander | |
| 7,692,586 B2 * | 4/2010 | Straatveit | G01S 3/46 342/424 |
| 7,705,781 B2 * | 4/2010 | Straatveit | G01S 3/46 342/424 |
| 8,031,121 B2 | 10/2011 | Rofougaran et al. | |
| 8,077,091 B1 | 12/2011 | Guigne et al. | |
| 8,354,961 B2 * | 1/2013 | Kawasaki | G01S 3/48 342/442 |
| 8,400,350 B2 * | 3/2013 | Uesato | G01S 3/46 342/147 |
| 8,588,808 B2 | 11/2013 | Levin et al. | |
| 8,599,758 B1 | 12/2013 | Ogale et al. | |
| 9,288,623 B2 | 3/2016 | Markhovsky et al. | |
| 9,606,213 B2 * | 3/2017 | Meiman | G01S 3/043 |
| 9,699,607 B2 | 7/2017 | Markhovsky et al. | |
| 2008/0122681 A1 | 5/2008 | Shirakawa | |
| 2012/0320787 A1 | 12/2012 | Sugar et al. | |
| 2013/0023285 A1 | 1/2013 | Markhovsky et al. | |
| 2013/0039391 A1 | 2/2013 | Skarp | |
| 2013/0169626 A1 | 7/2013 | Balan et al. | |
| 2013/0177098 A1 | 7/2013 | Jung et al. | |
| 2013/0225208 A1 | 8/2013 | Lu et al. | |
| 2013/0226451 A1 | 8/2013 | O'Neill et al. | |
| 2013/0293416 A1 | 11/2013 | Waters et al. | |
| 2014/0073345 A1 | 3/2014 | Chintalapudi et al. | |
| 2014/0073363 A1 | 3/2014 | Tidd et al. | |
| 2014/0094200 A1 | 4/2014 | Schatzberg et al. | |
| 2014/0171107 A1 | 6/2014 | Kao et al. | |
| 2015/0192656 A1 | 7/2015 | Werner et al. | |
| 2015/0234033 A1 | 8/2015 | Jamieson et al. | |
| 2015/0304979 A1 * | 10/2015 | Kumar | G01S 3/46 455/456.1 |
| 2017/0131335 A1 * | 5/2017 | Pratt | H04B 17/00 |
| 2017/0199269 A1 | 7/2017 | Allen et al. | |

FOREIGN PATENT DOCUMENTS

| | | |
|---|---|---|
| WO | 2013160286 | 10/2013 |
| WO | 2014074837 | 5/2014 |

OTHER PUBLICATIONS

Bocquet et al., "Using Enhanced-TDOA Measurement for Indoor Positioning," IEEE Microwave and Wireless Components Letters, vol. 15, No. 10, Oct. 2005, pp. 612-614.

Cavanaugh, "Inverse Synthetic Array Reconciliation Tomography." A Dissertation Submitted to the Faculty of Worcester Polytechnic Institute, (2013).

Kothari et al., "Robust Indoor Localization on a Commercial Smart-Phone," Carnegie-Mellon University, Aug. 2011.

* cited by examiner

LOCALIZATION WITH NON-SYNCHRONOUS EMISSION AND MULTIPATH TRANSMISSION

CROSS-REFERENCE TO RELATED APPLICATIONS

This application claims the benefit of U.S. Provisional Application No. 61/921,127, titled "Synthetic Aperture Radar Between Independent Wireless Nodes," filed Dec. 27, 2013, and U.S. Provisional Application No. 61/921,190, titled "Characterizing Multipath Delays in Antenna Array and Synthetic Aperture Radar Systems," filed Dec. 27, 2013. The contents of these applications are incorporated herein by reference.

This application is also related to U.S. application Ser. No. 14/579,365, titled "Characterizing Multipath Delays in Antenna Array and Synthetic Aperture Radar Systems," filed concurrently with the present application. This application is incorporated herein by reference.

STATEMENT AS TO FEDERALLY SPONSORED RESEARCH

This invention was made with Government support under Contract No. FA8721-05-C-0002 awarded by the U.S. Air Force. The Government has certain rights in the invention.

BACKGROUND

This invention relates to radio frequency localization, in some embodiments using synthetic aperture techniques, and in particular relates to use of techniques in which emission from targeted objects are not necessarily synchronous with the receiver and/or emissions from a targeted object to the receiver follow multiple discrete paths, such as direct path and one or more reflected paths.

Synthetic Aperture Radar (SAR) is a technique in which, generally, successive pulses of radio waves are transmitted from a transceiver to "illuminate" a target scene, and the echo of each pulse is received and recorded at the transceiver. The antenna of the transceiver is generally mounted on a moving vehicle, such as a moving aircraft, so that the antenna's location relative to the target changes over time. Signal processing of the recorded radar echoes allows combination of recordings from the multiple antenna locations, thereby forming the synthetic antenna aperture and providing finer resolution image of the illuminated target scene than what would be possible with the given physical antenna at a single location. Note that in such systems, the signal transmitted from the antenna is synchronized with the received echoes by virtue of the transmitting and receiving sections of the system having a common time reference, for example, in the form of a common and relatively stable oscillator (i.e., stable in the time scale of the round trip time of the reflected signals).

Localization of radio frequency reflectors or transmitters (collectively "emitters") may be complicated by the presence of reflecting structures that cause there to be multiple paths from a target object to a receiver. For example, in indoor localization, reflections from walls may introduce such multipath effects. As another example, in outdoor localization in urban environments, signals may be reflected from buildings causing multipath effects. In some situations, the reflected signals may have higher energy than the direct path from the target to the receiver.

SUMMARY

In one aspect, in general, with reference to FIG. 7 a method is used to determine a characterization (e.g., an azimuth and elevation characterizing direction) of a location of the target device. According to this method, a plurality of radio transmissions is received from the target device. Each radio transmission is received at first antenna at a fixed location, and is also received at an antenna at a location other than the fixed location of the first antenna such that the plurality of transmissions are received at a multiple locations other than the fixed location of the first antenna. For each radio transmission, a first channel characteristic for a radio channel from the target device to the first antenna is determined, and a second channel characteristic for a radio channel from the target device to the antenna at the location other than the fixed location of the first antenna is also determined. The first channel characteristics and the second channel characteristics are combined to determine a relative channel characteristic associated with each of the radio transmissions. These relative radio characteristics and the corresponding locations other than the fixed location of the first antenna are combined to determine the characterization of the location of the target device.

Aspects may include one or more of the following features.

Receiving the radio transmission at a location other than the fixed location of the first antenna comprises receiving said transmission at a second moving antenna. The plurality of locations other than the fixed location of the first antenna then comprise a plurality of locations of the second antenna.

The method further comprises causing the second antenna to move along a spatial path (e.g., a circular, linear, or irregular path), and the plurality of locations of the second antenna falling on the spatial path. In some examples, the spatial path comprises a repeated path (e.g., repeated traversals of a circular path).

Receiving the radio transmission at a location other than the fixed location of the first antenna comprises selecting a second antenna from a set of antennas. The plurality of locations other than the fixed location of the first antenna then comprises locations of the selected second antennas.

Each radio transmission comprises a plurality of components at different transmission frequencies. The first channel characteristic, the second channel characteristic, and the relative channel characteristic each comprises channel characteristics corresponding to the different transmission frequencies. In some examples, the radio transmissions comprise frequency division multiplexed encodings of transmission data, for example, the radio transmissions comprise Orthogonal Frequency Division Multiplexed (OFDM) encodings of transmission data.

The method further comprises identifying a plurality of directions of arrival plurality of radio transmissions, at least one of the directions of arrival corresponding to a reflected path from the target device.

The method further comprises identifying a most direct direction of arrival from the plurality of directions of arrival.

Identifying a most direct direction of arrival comprises combining the relative radio characteristics and the corresponding locations of the second antenna to determine a channel characteristic corresponding to each of the plurality of directions of arrival, the channel characteristic representing a variation a phase characteristic across different of the different transmission frequencies.

The method further comprises combining the relative radio characteristics and the corresponding locations of the second antenna to identify a most direct direction of arrival from the plurality of directions of arrival.

The first channel characteristic and the second channel characteristic each comprises a phase characteristic, and the relative channel characteristic comprises a relative phase characteristic.

Determining the directional characterization of location comprises determining a power distribution as a function of direction of arrival. In some examples, determining the directional characterization further comprises identifying a set of one or more directions of peak power of the power distribution.

The target device comprises at least one of a wide area cellular communication device and a wireless local area network device.

In another aspect, in general, a method is directed to determining a most direct direction of arrival of radio signals. A plurality of radio transmissions are received from a target device. Each radio transmission of the plurality of radio transmissions is received at a plurality of antennas at known locations (but not necessarily the same plurality of antennas for each transmission). Each radio transmission comprises a plurality of components at different transmission frequencies. The received radio transmissions are processed to determine, for each of a plurality of directions of arrival of the radio transmissions, a characterization of a channel from the target device. The characterization of the channel including characterizations of the channel at the different transmission frequencies of the components of the radio transmissions. At least one of the directions of arrival corresponds to a reflected path from the target device to the locations of the antenna. A most direct direction of arrival is determined from the plurality of directions of arrival. This includes computing for each direction of arrival a quantity representing a path length (e.g., a relative path length compared to one or more other directions of arrival) from the target using the characterization of the channel for the direction of arrival at the different transmission frequencies, and comparing said computed quantities to determine the most direct direction.

Aspects can include one or more of the following features.

The radio transmissions comprise frequency division multiplexed encodings of transmission data. In some examples, the radio transmissions comprise Orthogonal Frequency Division Multiplexed (OFDM) encodings of transmission data.

Receiving the plurality of radio transmissions from a target device at the plurality of antennas at known locations includes, for each radio transmission receiving said radio transmission at a first antenna at a fixed location and at a second moving antenna.

Processing the received radio transmissions to determine the characterization of the channel from the target device for each of the plurality of directions of arrival includes combining channel estimates from the target to the first antenna and to the second moving antenna at each of the different transmission frequencies.

Processing the received radio transmissions to determine the characterization of the channel from the target device for each of the plurality of directions of arrival includes combining channel estimates from the target to each antenna of an array of fixed antennas.

In another aspect, in general, a localization system is configured to perform all the steps of any of the above methods. In some examples, the system comprises the first fixed antenna at the fixed location, and a second movable to the plurality of locations other than the fixed location of the first antenna.

In another aspect, in general, software, embodied on a non-transitory machine-readable medium, comprises instructions for causing a processor of a localization system to perform all the steps of any of the above methods.

Other features and advantages of the invention are apparent from the following description, and from the claims.

DESCRIPTION

A number of approaches are described below in the context of localization of radio frequency transmitting devices in an indoor environment in which the transmitting devices are independent of a localization receiver and there are generally multiple reflected paths from the transmitting devices to the receiver. A specific embodiment is described in which the transmitting devices are cellular telephones (e.g., LTE transmission in the 700 MHz-2.6 GHz range) or wireless local area network devices (e.g., IEEE 802.11 standard ("WiFi") transmission in at 2.4 GHz or 5 GHz). Note that approaches that address the independence of the transmitting devices and the localization receiver and approaches that address multipath effects can be used independently in various applications, and together provide high accuracy in applications such as indoor localization. For reference, the wavelength of a radio signal at 2.4 Ghz and 5.0 Ghz is about 12.5 cm and 6.0 cm, respectively.

A first embodiment is described for two-dimensional localization using directly received signals. A second related embodiment is then described for three-dimensional localization using the same approaches. Further embodiments are then described in which multipath effects are addressed.

As introduced above, conventional Synthetic Aperture Radar (SAR) takes advantage of the feature that the radio signal that is transmitted toward and then reflected from a targeted object is generated by a clock signal that is also used in the processing of the received reflected signal. In particular, the relative phase of the transmitted signal and the received signal can be used to provide range information. In this sense, the emission from a SAR antenna is synchronous with the reception of the echo from the targeted object, thereby providing range information between the location of the transmitter when it emitted the signal to the targeted object and back to the location of the receiver when it received the reflected signal. In the application of localization of independent transmitting devices (e.g., LTE or WiFi devices), the receiver of the emission from the transmitting devices does not share a common clock or oscillator, and therefore the reception of the signal does not provide range information in the same manner as is available in conventional SAR techniques.

Figure 1:
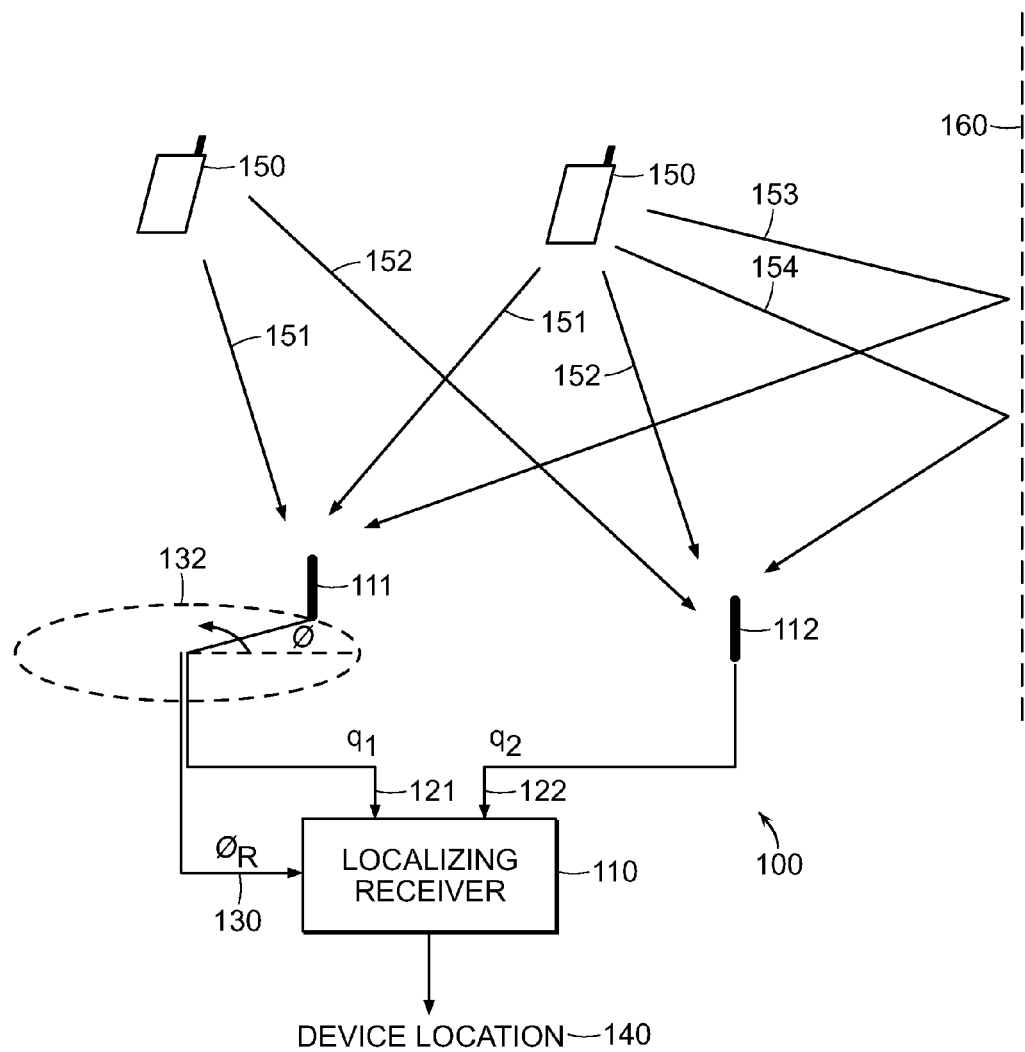
FIG. 1 is an illustration of a localization system that uses a moving antenna.

Referring to FIG. 1, an embodiment of a localization system 100 makes use of a moving antenna 111 as well as a fixed antenna 112. These antennas provide radio signals to a localization receiver 110, which outputs location information corresponding to one or more transmitting target devices 150 in the environment of the system 100. The target devices 150 (e.g., LTE or WiFi devices) emit transmissions that pass directly to the antennas 111-112 on paths 151-152 and/or that pass on reflected paths 153-154, which reflect off one or more reflecting objects 160 (e.g., walls, buildings, etc.). In the first embodiment, only direct paths 152-153 are considered. The localizing receiver 110 also receives information characterizing the location of the moving antenna 111. In this embodiment, the moving antenna rotates in a circle 132, and its location is characterized by an angle of rotation $\phi_R$ 130 of the antenna relative to a fixed reference direction ($\phi_R=0$).

In general, each target device 150 makes a series of transmissions, for example, each transmission comprising a transmission frame carrying data (e.g., which may include voice data). For example, in an LTE application, each frame may be 10 milliseconds long and WiFi frames are generally shorter than 10 milliseconds. In this embodiment, the moving antenna 111 is moving relatively slowly as compared to the frame length, and is therefore considered stationary for the duration of a frame for the analysis. For example, the rotating antenna 111 may have a rotation radius of 10 centimeters and a rotation period of 0.5 to 2 seconds (30-120 revolutions per minute), and therefore travels only a fraction of a millimeter during a frame transmission time. In LTE, the estimation procedure can be performed at a sub-frame level such that a separate estimate is performed for each sub-frame (e.g., 1 millisecond) and the antenna is only considered to be stationary for the duration of the sub-frame.

Figure 2:
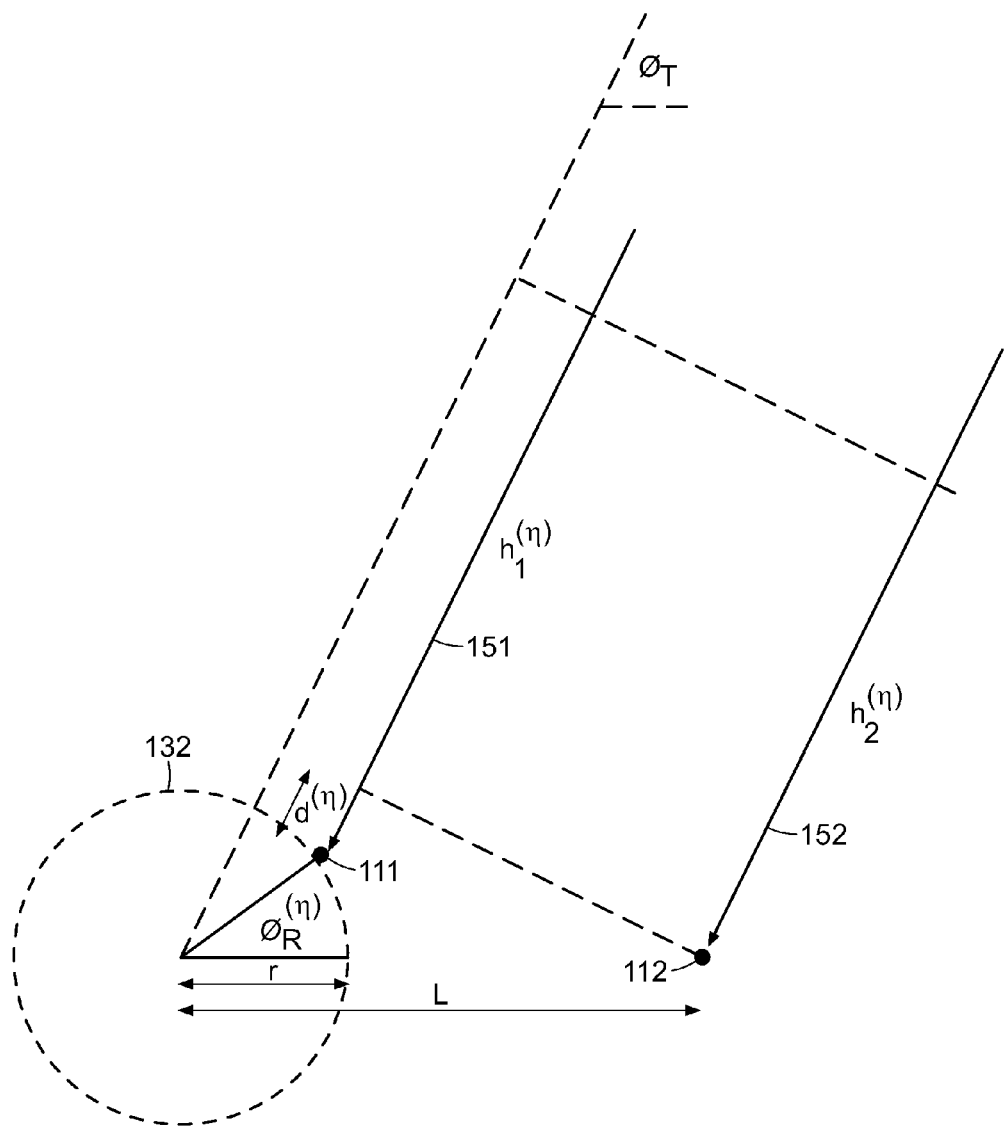
FIG. 2 is a diagram that illustrates signal propagation in a two-dimensional implementation.

Referring to FIG. 2, in a two-dimensional embodiment in which the target devices 150 and the antennas 111-112 are in (or at least assumed to be in) one plane, a representative direct transmission from a target device 150 is illustrated. In this illustration, the target device is at an angle $\phi_T$, and the rotating antenna is at an angle $\phi_R^{(n)}$. The superscript (n) represents that this is the $n^{th}$ reception from the target. As will be discussed further below, a series of transmissions n=1, ..., N, with the receiving antenna 111 at different angles $\phi_R^{(n)}$ are combined in localizing the target device 150. The direct path from the target device 150 follows a path 151 to the moving antenna 111 of length $d_1^{(n)}$ and a direct path 152 from the target device 150 to the fixed antenna 112 $d_0$. In this illustration, the difference in these path lengths is $$d_1^{(n)} - d_0 = d^{(n)} = D_0 - r\cos(\phi_T - \phi_R^{(n)}).$$

The constant term $D_0$ does not vary with $\phi_R^{(n)}$. In the limit that the target device is far from antennas, $D_0 = L\cos\phi_T$, but as is shown below, the specific value of $D_0$ is not significant. The transmission from the target device is assumed to include a known (complex valued) signal p that is modulated by a carrier, which is represented as the complex exponential $\exp(j\omega t)$. For example, the known signal is a pilot signal or an error corrected data signal. The receiver demodulates the received signal at the antennas with an oscillator that is offset in phase by $\psi^{(n)}$ from the transmitting transmitter. The superscript (n) represents the fact that the receiver does not assume a fixed phase offset between transmissions from the target device. For example, frequency differences may not vary significantly during a single frame but may nevertheless exhibit significant phase drift between transmissions. After demodulation the received signal at moving antenna 111 has a phase offset due to the distance $d_1^{(n)}$ as well as the phase difference $\psi^{(n)}$ and the demodulated signal at the fixed antenna 112 has a phase offset due to the distance $d_0$ as well as the phase difference $\psi^{(n)}$. Specifically, $$q_1 = pm_1\exp(-j(kd_1^{(n)} + \psi^{(n)})), \text{ and}$$

$$q_0 = pm_0\exp(-j(kd_0 + \psi^{(n)})).$$

where $k = 2\pi/\lambda = \omega/c$, and c is the propagation speed of the signal, and $m_0$ and $m_1$ are complex quantities (i.e., representing constant attenuation and phase offset) that do not depend on n. The receiver forms channel estimates using these demodulated values as $$h_1^{(n)} = q_1/p, \text{ and}$$

$$h_0^{(n)} = q_0/p.$$

Note that both these channel estimates, $h_1^{(n)}$ and $h_0^{(n)}$ are affected by the unknown phase offset $\psi^{(n)}$. However, a ratio of the channel differences is only affected by the difference in differences in the distances $d^{(n)} = d_1^{(n)} - d_0$ $$\tilde{h}^{(n)} = \frac{h_1^{(n)}}{h_0^{(n)}} = \frac{m_1}{m_0}\exp(-jkd^{(n)})$$

This ratio can be represented as $$\tilde{h}^{(n)} = h_0\exp(-jkr\cos(\phi_T - \phi_R^{(n)}))$$

where $h_0 = (m_1/m_0)\exp(-D_0)$ is a complex quantity, in which $D_0$ depends on $\phi_T$ and L but not on $\psi^{(n)}$ or $\phi_R^{(n)}$.

Combination of N channel estimates $\tilde{h}^{(n)}$ at corresponding receiving antenna angles $\phi_R^{(n)}$ then makes use of a computation analogous to that used in SAR receivers, namely $$P(\phi) = |\tilde{h}(\phi)|^2 = \left|\sum_{n=1}^{N} a^{(n)}(\phi)\tilde{h}^{(n)}\right|^2,$$

where $$\tilde{h}(\phi) = \sum_{n=1}^{N} a^{(n)}(\phi)\tilde{h}^{(n)}, \text{ and } a^{(n)}(\phi) = \exp(jkr\cos(\phi - \phi_R^{(n)})).$$

Note that it should be evident that $a^{(n)}(\phi)\tilde{h}^{(n)}$ has a maximum magnitude at $\phi = \phi_T$, as does the summation over the N receptions from the target device. Therefore, with a single transmitting device 150, estimation of the direction of arrival $\phi_T$ is performed by finding the maximum of the computed $P(\phi)$.

When there are multiple target devices 150 in the environment, in some embodiments, content of each received frame identifies the source of the transmission. Therefore, the localizing receiver 110 collects transmissions for each target device and records them separately applying the computation of $P(\phi)$ independently for each target device.

In general, the moving antenna moves independently of the transmissions being received, for example, rotating at a constant rate. The localizing receiver 110 receives the angle of rotation $\phi_R^{(n)}$ corresponding to each received frame.

In the case of an orthogonal frequency division multiplexed (OFDM) transmission from the target device, essentially a set of transmission frequencies (indexed by f) are present in each transmitted frame from a target device, and a set of channels estimates $\tilde{h}_f^{(n)}$ are obtained from a received transmission, and separate directional power estimates $P_f(\phi)$ may obtained for each frequency. In some implementations, separate direction estimates may be made from each frequency, or alternatively, the power estimates may be combined to determine a single overall direction estimate.

Figure 3:
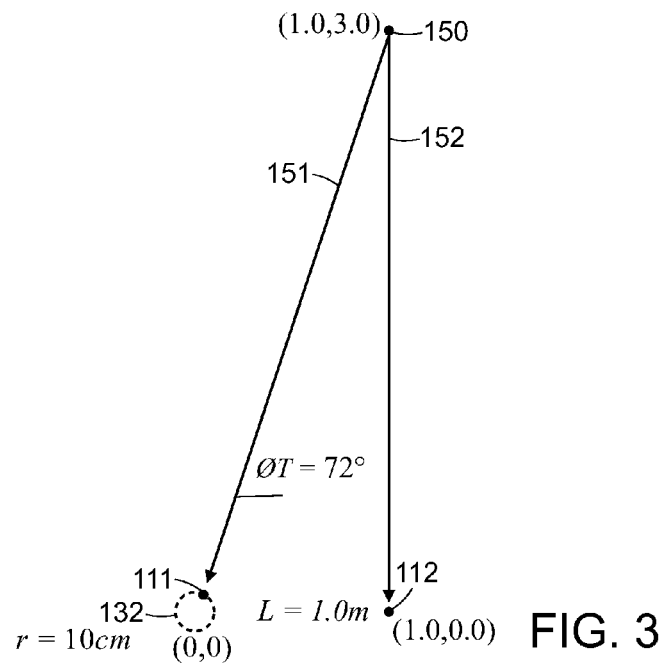
FIG. 3 is a diagram that illustrates an example with a single target device.

Referring to FIG. 3, a simulation of a single target device is illustrated in a situation in which:

r=10 cm with the antenna rotating about a point (0,0)

L=1.0 m such that the fixed antenna is at coordinates (1.0, 0.0)

the target device 150 is at coordinates (1.0,3.0) such that $\phi_T \approx \tan^{-1}(3.0) = 72°$ the operating frequency is 5 GHz, so $\lambda \approx 6.0$ cm.

Figure 4:
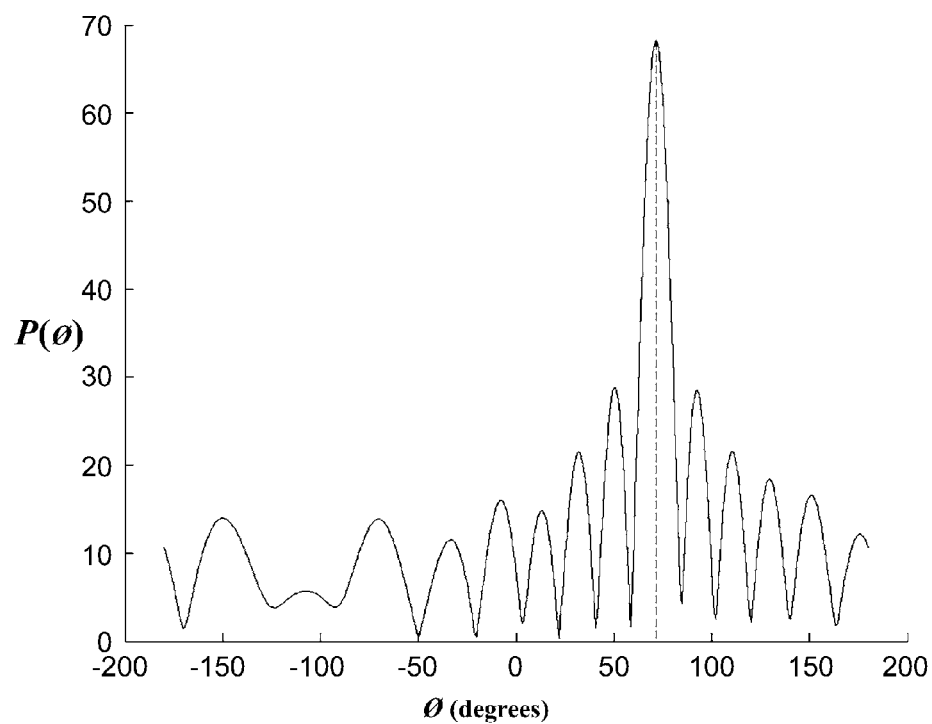
FIG. 4 is a plot of power as a function of direction of arrival for the example shown in FIG. 3.

A simulation in which N=32 observations equally spaced during one rotation of the moving antenna 111 yields $P(\phi)$ as illustrated in FIG. 4. Note that $P(\phi)$ has a peak at approximately $\phi=72°$ consistent with the simulated environment shown in FIG. 3.

A second embodiment makes use of the same arrangement of fixed and moving antennas as illustrated in FIG. 1. However, the target devices 150 are not assume to be in the same plane as the antennas, and a three dimensional localization is performed. Specifically, rather than only estimating an azimuth angle $\phi$, and elevation angle $\theta$ is also estimated. In this embodiment, $\phi=0$ is in a direction orthogonal to the plane of rotation of the moving antenna 110, and $\theta=\pi/2$ is in the plane of the rotating antenna. In an example in which a target is in direction $(\phi_T, \theta_T)$, using a similar analysis as presented above for the two-dimensional embodiment, the difference in direct transmission distances from the target device 150 to the moving and fixed antennas, respectively, is $$d_1^{(n)} - d_0 = d^{(n)} = D_0 - r \sin\theta_T \cos(\phi_T - \phi_R^{(n)})$$

As in the first embodiment, the ratio of the channel estimates can be represented as $$\tilde{h}^{(n)} = h_0 \exp(-jkr \sin\theta_T \cos(\phi_T - \phi_R^{(n)}))$$

where $h_0 = \exp(-jD_0)$ is a complex quantity that depends on $\phi_T$, $\theta_T$ and L but not on $\psi^{(n)}$ or $\phi_R^{(n)}$.

Combination of N channel estimates $\tilde{h}^{(n)}$ at corresponding receiving antenna angles $\phi_R^{(n)}$ then makes use of a computation analogous to that used in SAR receivers, namely $$P(\phi, \theta) = \left| \sum_{n=1}^{N} a^{(n)}(\phi, \theta) \tilde{h}^{(n)} \right|^2,$$

where $$a^{(n)}(\phi, \theta) = \exp(jkr \sin\theta \cos(\phi - \phi_R^{(n)})).$$

The location of the maximum of $P(\phi, \theta)$ then provides the direction estimate for $(\phi_T, \theta_T)$.

Note that the approach to computing the directional power distribution, $P(\phi, \theta)$, shown above (often referred to as a "Bartlett estimator") can be replaced with other procedures. For instance, a covariance-based and/or eigen-decomposition approach (e.g., a MUSIC, "MUltiple SIgnal Classifier," algorithm, or ESPRIT, "Estimation of Signal Parameters via Rotational Invariance Technique," algorithm) can be used to estimate $P(\phi, \theta)$ from the $\tilde{h}^{(n)}$. Therefore, the procedure used to further process $P(\phi, \theta)$ can be carried out without regard to which approach is used to estimate it.

Figure 5:
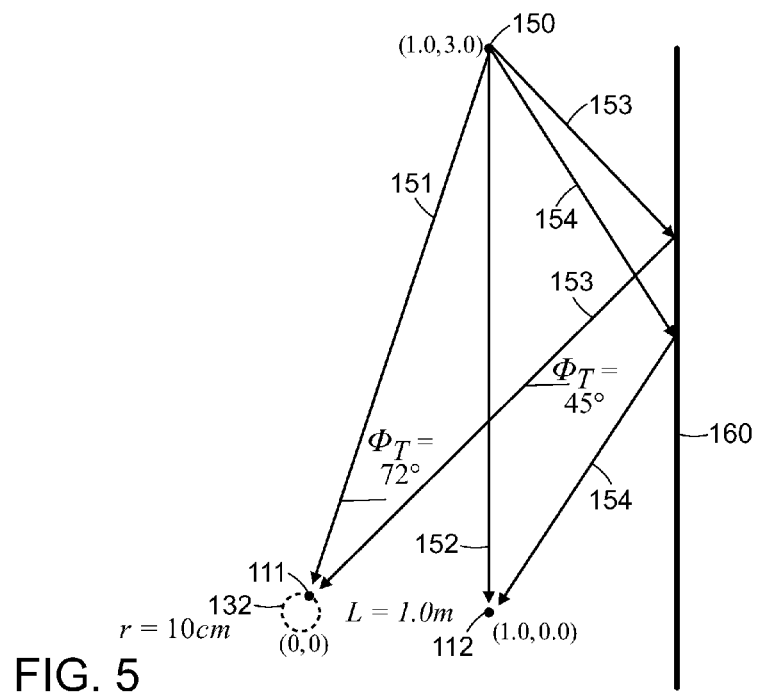
FIG. 5 is a diagram that illustrates an example with a single target device in which a direct and a reflect path are present.

In the description of the first and second embodiments above, only direct paths 151-152 are considered. In a third embodiment, multiple paths are assumed. Referring back to FIG. 1, both a direct path 151 and a reflected path 153 can pass from the target device 150 to the moving antenna 111, and similarly, both a direct path 152 and a reflected path 154 pass to the fixed antenna 112. Referring to FIG. 5, an example similar to that shown in FIG. 3 further has a reflecting surface 160 at x=2.0. As a result, a direct path from the target device 150 to the moving antenna has approximately an azimuth of $\theta_T = 72°$ along path 151, and approximately an angle of $\theta_T = 45°$ along reflected path 153. As in the first embodiment, the ratio of channel estimates $$\tilde{h}^{(n)} = \frac{h_1^{(n)}}{h_2^{(n)}}$$

are computed as described above, and $P(\phi)$ is computed as described above.

Figure 6:
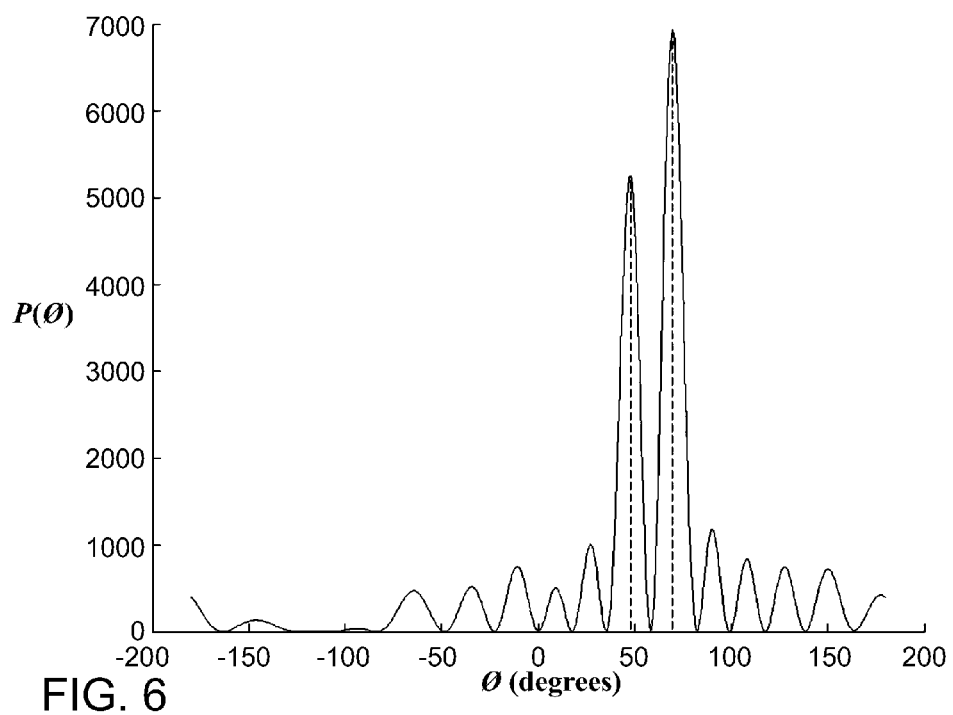
FIG. 6 is a plot of power as a function of direction of arrival for the example shown in FIG. 5.
Figure 7:
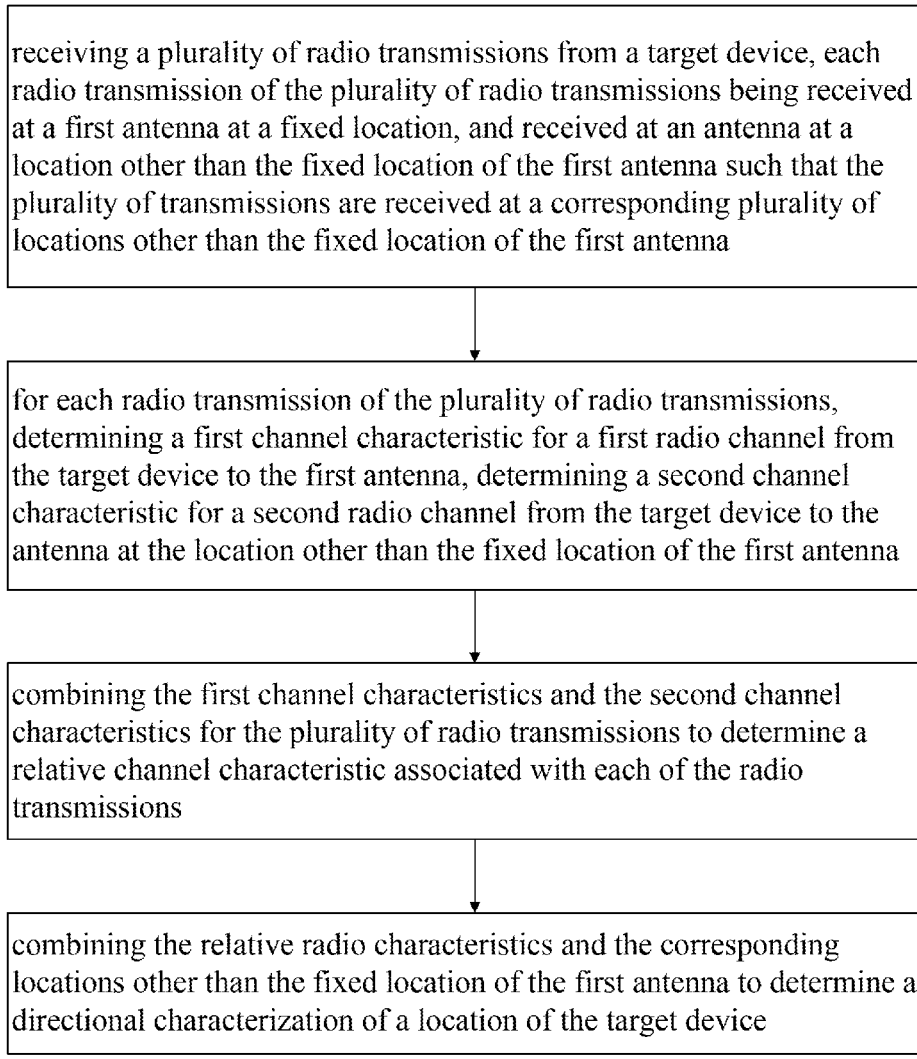
FIG. 7 is flow chart of a method for determining a characterization of a location of a target device.

Referring to FIG. 6, in this example, $P(\phi)$ has two peaks as would be expected from the geometry of the simulation. Also, in this simulation, the direct path at $\phi=72°$ corresponds to peak with greater magnitude than a peak corresponding to the indirect path at $\phi=45°$. However, in general, it is not reliable to assume that the greatest energy comes from the direct path. For example, the direct path may be attenuated by an obstacle while the reflected path is not. An approach described below makes use of an estimate of the absolute delay along each path, and the shortest delay path is assumed to be the direct path.

An approach to estimating the absolute delay of a signal arriving from a particular direction makes use of the signal having components transmitted at different frequencies. In this third embodiment, a set of known signals $p_f$ are transmitted at a set of frequencies indexed by f. As introduced above, in one example, an OFDM signal is transmitted in this manner such that signal $p_f$ is transmitted with a wave number $k_f = 2\pi/\lambda_f = \omega_f/c$, for example, for integer indices, $\omega_f = \omega_0 + f\Delta\omega$.

In order to determine relative delay between paths arriving from different directions, in this third embodiment, the SAR approach is used to determine the (complex) response for each direction of arrival. For example, in the example shown in FIGS. 5 and 6, the complex response is computed at the peaks located at azimuth $\theta_T=72°$ and $\theta_T=45°$. In FIG. 5, the target device 150 to the fixed antenna is $d_0$, the direct distance from the target device 150 to the center for the circle 132 is $d_1$ and the distance along the reflected path from the device 150 to the center of the circle is $d_2$. A vector of wave numbers $$\underline{k} = (\omega_0, \ldots, \omega_{F-1})^T/c$$

yields a vector of ideal direct channels $$\underline{h}_1 = \underline{h}(\phi_{T1}) = \exp(-j\underline{k}d_1)\underline{h}_1'$$

where $\underline{h}_1'$ is the part of the direct channel not explained by the distance $d_1$. Similarly, $$\underline{h}_2 = \underline{h}(\phi_{T2}) = \exp(-j\underline{k}d_2)\underline{h}_2'$$

and the ideal direct channel to the fixed antenna is $$\underline{h}_0 = \exp(-j\underline{k}d_0)\underline{h}_0'.$$

Therefore, the quantity computed from the N receptions for all the F frequencies $$\tilde{\underline{h}}_1 = \tilde{\underline{h}}(\phi_{T1}) = \sum_{n=1}^{N} \underline{a}^{(n)}(\phi_{T1})\tilde{\underline{h}}^{(n)}$$

is approximately $$\tilde{\underline{h}}_1 \approx \exp(-j\underline{k}(d_1 - d_0))\frac{\underline{h}_1'}{\underline{h}_0'}.$$

Under the assumption that the phase (but not necessarily the magnitude) of the elements of $\underline{h}_1'$ are equal, and the phase of the elements of $\underline{h}_0'$ are equal (but not necessarily the same as for $\underline{h}_1'$), then the phase of $\tilde{\underline{h}}_1$ satisfies $$\angle \tilde{\underline{h}}_1 \approx -\underline{k}(d_1 - d_0) + \text{constant}.$$

Therefore because $k_f = (\omega + f\Delta\omega)/c$, the elements of this phase vector $\angle \tilde{\underline{h}}_1$ vary with a proportionality $-\Delta\omega(d_1 - d_0)/c$ (recognizing that phase may need to be "unwrapped" to provide continuity of the phase elements). Similarly, the elements of this phase vector $\angle \tilde{\underline{h}}_2$ vary with a slope $-\Delta\omega(d_2 - d_0)/c$. Therefore, if $d_1 < d_2$, as is the case in this example, the slope for $\phi = 72°$ is greater than the slope for the path at $\phi = 45°$, and therefore the receiver determines that the $\phi = 72°$ peak in $P(\phi)$ corresponds to the direct path (or more generally, the most direct of possibly reflected paths).

In the description of the third embodiment above, the complex response in a particular direction is computed using a SAR technique. However, it should be understood that alternate approaches, including determining the directional responses from a fixed array of antennas that concurrently receive the same signal, can be used to determine the responses that permit discrimination according to travel path length (e.g., direct versus indirect path lengths).

Note that in some examples, only a two dimensional (single direction angle $\phi$) is used. The same approach is applicable in the three dimensional case where peaks in $P(\phi,\theta)$ are first identified, and then the shortest distance is determined by determining the largest slope in the phase variation over frequencies. Note also, that the frequency components are not necessary uniformly spaced in frequency, and the slope determination can take account of this non-uniform spacing in estimating the slope of the phase variation with frequency.

Therefore, referring back to FIG. 1, having identified the peaks in $P(\phi)$, and resolved which of those peaks correspond to the direct (or at least the shortest) path to the target device 150, the localizing receiver 110 provides as output the direction $\phi_T$ to the target as part of its reported device locations 140. As introduced above, because the received signals identify the target device (e.g., by a device identified encoded in the received frames), the localizing receiver separately computes the direction to the targets 150, and the reported device locations 140 can include directions in association with the device identifiers. In some embodiments, a graphical display indicates the locations of the target devices in an area being monitored by one or more localizing receivers 110.

In an alternative embodiment, moving antennas at two (or more) different locations and a corresponding fixed antenna for each moving antenna, or a single fixed antenna, are used to determine multiple different directions to each target, and a triangulation approach is used to combine the direction estimates. In yet other examples, a SAR approach is used to directly determine a distribution $P(\phi, \theta, r)$ where r is the range of the target device. In other embodiments, it is not necessary that the moving antenna or antennas follow circular paths as other repeating of non-repeating (e.g., irregular) patterns of movement of the moving antenna may be used. For example, an antenna may follow a linear path, or may follow an irregular path (e.g., along the path of a vehicle to which it is attached). Furthermore, rather than using one (or a set) of antennas that move, successive selection of different subsets (e.g., selection of successive single) of antennas at different fixed locations can be used. In this way, the mechanical requirements of a moving antenna are essentially replaced with electronic requirements to switch received signals (e.g., at the transmission frequency or at an intermediate or baseband frequency).

Implementations of the approaches described above may use hardware (e.g., application-specific integrated circuits, ASICs), or in software (e.g., using a general purpose processor, a special purpose controller, or a processor in a software defined radio, such as an Ettus Research USRP N210 with a GNU radio), or using a combination of software and hardware. The software includes instructions that are stored on a non-transitory machine readable medium (e.g., semiconductor memory). The hardware, processor, and/or instruction storage can be included within the localizing receiver 110. The system can also include the actuator (e.g., motor) and mechanical linkage required to physically move the antenna as described above. The location (e.g., angle) of the moving antenna can be determined using a sensor (e.g., a rotary encoder) that provides location-indicative measurements to the localizing receiver, or the location (e.g., angle) of the antenna may be inferred according to the commands provided to the actuator.

It is to be understood that the foregoing description is intended to illustrate and not to limit the scope of the invention, which is defined by the scope of the appended claims. Other embodiments are within the scope of the following claims.

What is claimed is:
1. A computer implemented method comprising:
receiving a plurality of radio transmissions from a target device, each radio transmission of the plurality of radio transmissions being received at a first antenna at a fixed location, and received at an antenna at a location other than the fixed location of the first antenna such that the plurality of transmissions are received at a corresponding plurality of locations other than the fixed location of the first antenna;
for each radio transmission of the plurality of radio transmissions, determining a first channel characteristic for a first radio channel from the target device to the first antenna, determining a second channel characteristic for a second radio channel from the target device to the antenna at the location other than the fixed location of the first antenna;
combining the first channel characteristics and the second channel characteristics for the plurality of radio transmissions to determine a relative channel characteristic associated with each of the radio transmissions; and
combining the relative radio characteristics and the corresponding locations other than the fixed location of the first antenna to determine a directional characterization of a location of the target device.
2. The method of claim 1 wherein receiving the radio transmission at a location other than the fixed location of the first antenna comprises receiving said transmission at a second moving antenna, wherein the plurality of locations other than the fixed location of the first antenna comprises a plurality of locations of the second antenna.

3. The method of claim 1 further comprising causing the second antenna to move along a spatial path, the plurality of locations of the second antenna falling on the spatial path.

4. The method of claim 3 wherein the spatial path comprises a repeated path.

5. The method of claim 1 wherein receiving the radio transmission at a location other than the fixed location of the first antenna comprises selecting a second antenna from a set of antennas, wherein the plurality of locations other than the fixed location of the first antenna comprises locations of the selected second antennas.

6. The method of claim 5 wherein the radio transmissions comprise frequency division multiplexed encodings of transmission data.

7. The method of claim 6 wherein the radio transmissions comprise Orthogonal Frequency Division Multiplexed (OFDM) encodings of transmission data.

8. The method of claim 5 further comprising:
identifying a plurality of directions of arrival plurality of radio transmissions at the locations of the second antenna, at least one of the directions of arrival corresponding to a reflected path from the target device to the locations of the second antenna.

9. The method of claim 8 further comprising:
identifying a most direct direction of arrival from the plurality of directions of arrival.

10. The method of claim 8 wherein identifying a most direct direction of arrival comprises combining the relative radio characteristics and the corresponding locations of the second antenna to determine a channel characteristic corresponding to each of the plurality of directions of arrival, the channel characteristic representing a variation a phase characteristic across different of the different transmission frequencies.

11. The method of claim 1 wherein each radio transmission comprises a plurality of components at different transmission frequencies, and wherein the first channel characteristic, the second channel characteristic, and the relative channel characteristic each comprises channel characteristics corresponding to the different transmission frequencies.

12. The method of claim 1 further comprising:
combining the relative radio characteristics and the corresponding locations of the second antenna to identify a most direct direction of arrival from the plurality of directions of arrival.

13. The method of claim 1 wherein the first channel characteristic and the second channel characteristic each comprises a phase characteristic, and the relative channel characteristic comprises a relative phase characteristic.

14. The method of claim 1 wherein determining the directional characterization of location comprises determining a power distribution as a function of direction of arrival.

15. The method of claim 14 wherein determining the directional characterization further comprises identifying a set of one or more directions of peak power of the power distribution.

16. The method of claim 1 wherein the target device comprises at least one of a wide area cellular communication device and a wireless local area network device.

17. A localization system configured to perform all the steps of claim 1.

18. Software, embodied on a non-transitory machine-readable medium, comprising instructions for causing a processor of a localization system to perform all the steps of claim 1.

19. A localization system comprising:
a plurality of antenna;
a receiver coupled to the plurality of antennas for receiving radio signals acquired at the plurality of antennas and configured to process a plurality radio transmissions from a target radio device, including
receiving the plurality of radio transmissions from a target device, each radio transmission of the plurality of radio transmissions being received at a first antenna at a fixed location, and received at an antenna at a location other than the fixed location of the first antenna such that the plurality of transmissions are received at a corresponding plurality of locations other than the fixed location of the first antenna,
for each radio transmission of the plurality of radio transmissions, determining a first channel characteristic for a first radio channel from the target device to the first antenna, determining a second channel characteristic for a second radio channel from the target device to the antenna at the location other than the fixed location of the first antenna,
combining the first channel characteristics and the second channel characteristics for the plurality of radio transmissions to determine a relative channel characteristic associated with each of the radio transmissions, and
combining the relative radio characteristics and the corresponding locations other than the fixed location of the first antenna to determine a directional characterization of a location of the target device.

20. The system of claim 19 further comprising the first fixed antenna at the fixed location, and a second movable to the plurality of locations other than the fixed location of the first antenna.

* * * * *